United States Patent [19]

Hager

[11] 4,168,843

[45] Sep. 25, 1979

[54] SNOW SLED

[76] Inventor: Floyd D. Hager, 2700 W. 60th Ave., Denver, Colo. 80221

[21] Appl. No.: 877,607

[22] Filed: Feb. 14, 1978

[51] Int. Cl.² ............................................. B62B 13/08
[52] U.S. Cl. ..................................... 280/21 R; 188/8
[58] Field of Search .................... 280/21 R, 18, 12 R; 188/8

[56] References Cited

U.S. PATENT DOCUMENTS

| | | | |
|---|---|---|---|
| 2,910,708 | 11/1959 | Albright | 280/18 |
| 3,202,437 | 8/1965 | Masbruch | 188/8 |
| 3,329,440 | 7/1967 | Tonelli | 280/16 |
| 3,479,046 | 11/1969 | Thompson | 280/18 |
| 3,519,284 | 7/1970 | Toki | 280/16 |
| 3,900,208 | 8/1975 | Hjelmquist | 280/21 R |

FOREIGN PATENT DOCUMENTS

| | | | |
|---|---|---|---|
| 977799 | 11/1975 | Canada | 280/21 R |
| 67335 | 1/1914 | Switzerland | 280/21 R |

*Primary Examiner*—Robert R. Song
*Attorney, Agent, or Firm*—Richard D. Law

[57] ABSTRACT

A snow sled having braking and steering means on a toboggan-like main body having a substantially thin, flat main portion and a forward arcuate portion, said main body extending continuously from front to back and from side to side. Runners depend downwardly from a bottom surface of the main body, and a steering runner with a thin central blade is slidably and rotatably mounted on the main body having a steering arm extending from the steering runner for the sled operator. Braking means are provided by a pivotal plate, at the rear of the main body, pitched downwardly so that when lowered into the snow, the plate digs into the snow and forces snow upwardly and over the plate.

6 Claims, 3 Drawing Figures

SNOW SLED

BACKGROUND OF THE INVENTION

The present invention relates to sleds, and more particularly to sleds having steering and braking ability.

The toboggan is of ancient origin and traditionally curved up at one end, and usually comprising low handholds at the sides, used for coasting or traveling on snow or ice. Steering is accomplished, if at all, by twisting the forward body of the sled, and no provision is made for braking.

It is therefore an object of the present invention to provide steering and braking means in a sled having a lowslung horizontally planar main body.

It is a further object of the present invention to provide a steering means permitting a high degree of control.

It is a further object of the present invention to provide a braking means which has variable stopping power, which can be varied up to a high degree of stopping power, and which can be locked when the operator leaves the sled.

SUMMARY OF THE INVENTION

These and other objects are accomplished by a sled having a main body which is longitudinally continuous, with laterally spaced runners mounted directly on the bottom surface of the main body, and means for supporting a sled operator. Braking means are provided which comprise a plate member pivotally mounted to the main body and pitched downwardly whereby pivotal operation by the sled operator causes downward movement of the plate member to dig into the snow and force snow rearwardly upwardly over the plate member in a "rooster tail" effect.

The braking means may further comprise elongated pivoting supports mounted to the sled through a mounting means such as an angled bar member extending upwardly from the rear portion of the main body. One pivoting support extends forwardly providing handle means to be operable by the sled operator. Locking means may provide a constant braking force to the pivoting support when the sled is not in use. Steering means are provided which may comprise a forwardmost steering member which may be ribbed, and which has a forward arcuate portion and a rearward flat portion similar to a ski or toboggan which is rotatably, pivotally, and slidably mounted to the front of the sled through a steering arm extending between the steering member and the sled operator. The rotatable, pivotal, and slidable mounting may be provided by a pair of relatively rotatable plates bearing a pin portion which has a slot for pivotally and slidably receiving the steering arm.

DESCRIPTION OF THE PREFERRED EMBODIMENT

Figure 1:
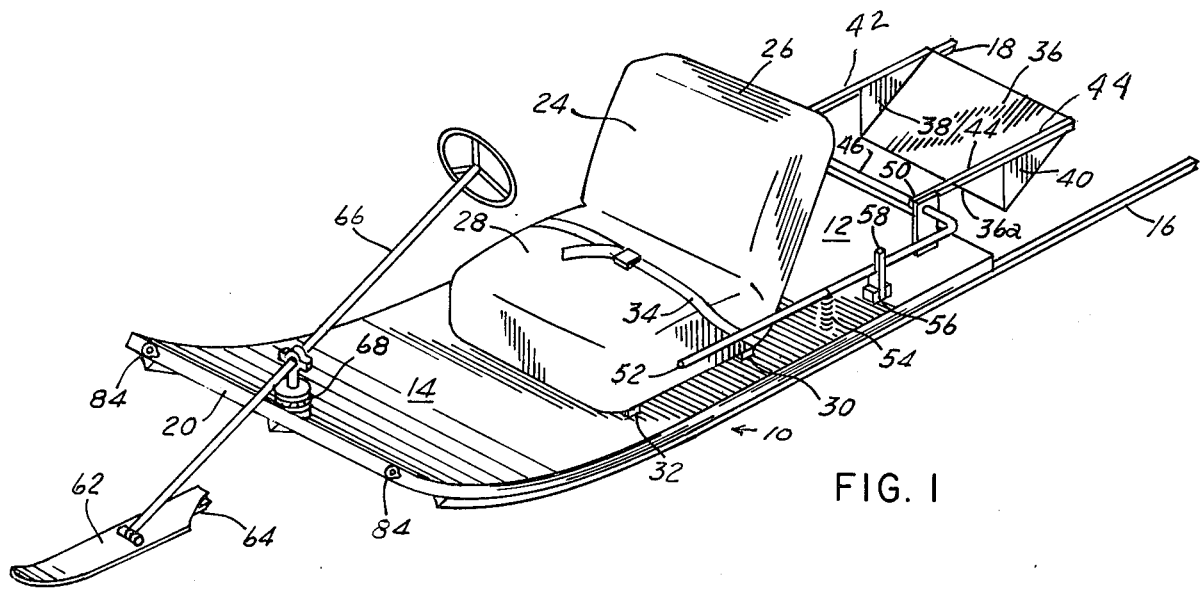
FIG. 1 is a perspective view of the sled of the present invention.

Referring now to FIG. 1, the sled of the present invention comprises a main body 10 having a substantially flat main portion 12 (of a general toboggan shape) and a forward arcuate portion 14 curving upwardly away from the snow and providing a prow-like action as the sled moves through the snow. The main body 10 may have a peripheral flange on the upper surface for keeping it clear of the snow. The main body 10 may be constructed in a manner similar to a toboggan having numerous wooden longitudinal members or slats extending longitudinally, and held together by lateral bands, or the main body may preferably be formed of one piece of molded plastic. Other construction methods may be used, but essentially the main body should extend longitudinally continuously from front to back and should have relatively closely spaced top and bottom surfaces. The bottom surface is arranged for contacting snow during operation and is substantially flat in the main portion of the main body.

A plurality of laterally spaced, parallel runners are mounted on the bottom surface of the main body. A pair of runners 16, 18 are mounted near the lateral edges of the main body 10. These runners extend rearwardly for a distance beyond the main body and forwardly to the forwardmost edge of the main body, where they are curved inwardly to provide a lateral support and an edge portion for the main body. The runners 16, 18 may be inwardly curved and joined through a lateral section 20 across the front of the sled to provide a continuous runner member.

Figure 2:
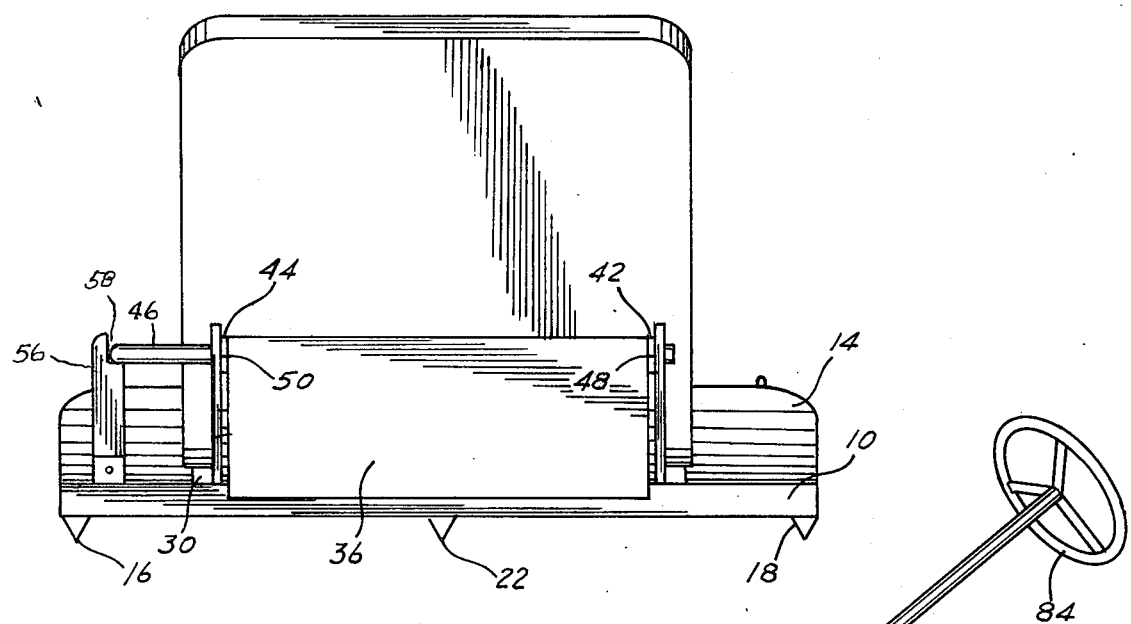
FIG. 2 is a rear view of the sled of the present invention.

The runners may extend for a distance beyond the rear of the main body 10 in order to provide added stability, especially during braking and steering operations. The laterally spaced runners 16, 18 extend rearwardly beyond the location of the plate member of the breaking means, described below, such that runner action is provided rearwardly of the braking action. A third runner 22 may extend rearwardly beyond the main body 10 for a slight distance, less than that of the side runners 16, 18, and thence forwardly along the entire main portion of the main body, and, if desired, along a portion of the arcuate forward portion 14 of the main body. As shown in FIG. 2, it is preferred that the runners 16, 18, 22 be mounted directly on the bottom surface of the main body 10. The runners, preferably, are triangular in cross section, with the base of the triangle mounted on the main body and a vertex of the triangle extending outwardly therefrom. In operation, the sled is supported partly by the runners, and partly by the bottom surface of the main body in substantial contact with the snow.

Means for supporting a sled operator are provided on the top surface of the main body, in the approximate center of the main body. The supporting means are designed to exploit the potentially low center of gravity, and generally extend the width of the main body. A cushioned or padded seat (shown generally by number 24) comprises a back 26, which is angled slightly rearwardly, and a bottom 28 which is mounted to the top surface of the main body 10 on mounting flanges 30, 32. The mounting flanges 30, 32 may be provided with longitudinal adjustment means, if desired, for accomodating operators of different size. For added support and safety of the operator, a lap seat belt 34 may be provided, and it is secured to the main body or the rear mounting flanges of the seat 24.

Braking means are provided to put a drag on the sled to slow the sled, and as a brake to maintain the sled in a stopped position. The braking means comprise a plate member 36, the length of which may be approximately one half of the width of the sled, and the width of which should be about one half of the length. While the size of the plate member is not critical, a larger plate member will provide greater stopping force. The plate member 36 includes two parallel triangular flange portions 38, 40. These flanges extend normally to the upwardly depending main portion so that the forward edge 36a is depressed or piched downwardly at an acute angle, e.g. 30°, to the general plane of the sled. The plate member is mounted by the flanges to support arms 42 and 44 mounted on and depending from a pivoted support bar 46. The support bar 46 is pivotally mounted in upright supports 48, 50. The pivotal supports causing the plate edge 36a to be angled downwardly when the plate is depressed. The upwardly extending portions extend from the rearmost portion of the main body and are spaced transversely to the length of the body. The vertical pivotal movement of the brake is provided by a lever 52 secured to bar 46 to pivot the same in supports 42 and 44.

A spring bias 54 between the handle and the sled, such as a coil spring, retains the handle in a downward non-braking position by normal spring tension. A lock arm 56, terminating in an end portion 58, is also mounted in the vicinity of the handle 52 between the seat 24 and the bar member 46. The handle portion may be moved slightly laterally to engage the lock arm and be held in locked in the down or non-braking position.

In operation, the lifting by the operator of the handle causes the support bar 46 to turn, which causes the plate member 36 mounted on the rearmost portions of the pivoting arms to be lowered. The plate 36 maintains its planar configuration as the leading edge is lowered into the snow. Leverage for forcing the plate into the snow is provided by the handle. The distance from the plate 36 to the pivotal support of the angled bar member 46 is about one third of the distance of the forward handle portion 52 and the pivotal support.

As stated, the plate is canted or pitched downwardly with the leading edge entering the snow. As the plate 36 is lowered into the snow, the angle tends to decrease slightly as the depth of the plate in the snow increases. Snow is forced rearwardly upwardly over the plate 36, as shown at 60, creating a "rooster tail" effect and smoothly retarding or stopping the sled. The operator may lock the sled on an incline by placing the handle 52 in the lock 58 position on top of the lock arm 56.

Figure 3:
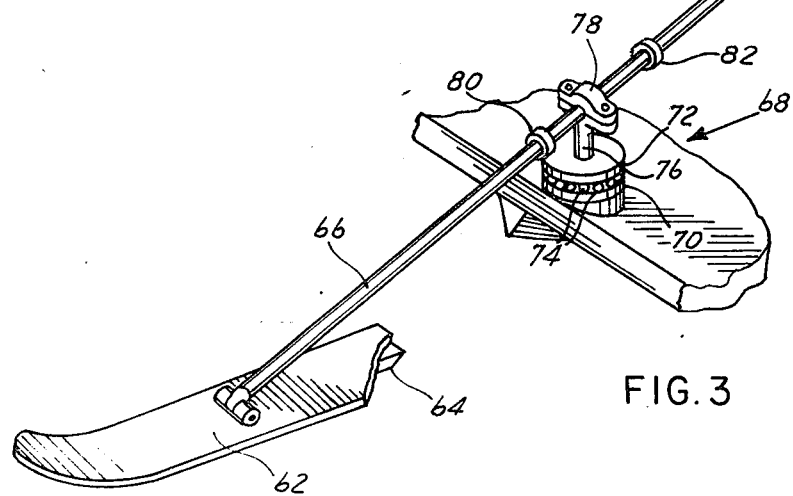
FIG. 3 is a perspective view of the steering means of the sled of the present invention.

Steering means are mounted on the forward arcuate portion 14 of the main body 10 of the sled. As shown in FIG. 3, the steering means comprises a forwardmost steering member 62 having an upwardly curving, pointed, tip and an elongated planar body, similar to a snow ski. Thin, blade-type rib means 64, such as an ice skate-type blade, extends longitudinally along 62. A steering arm 66 pivoted on member 62 extends rearwardly and upwardly from the top surface of the steering member 62 to a rotatable mounting 68 on the forward arcuate portion of the main body of the sled. The rotatable mounting 68 includes a first fixed annular plate 70 mounted on the main body and a second rotatable annular plate 72 mounted coaxially opposite to and parallel to the first plate. Ball bearings 74 or the like are held between the annular plates 70, 72 to reduce friction as the second plate 72 rotates in relation to the first. The second plate 72 includes a pin portion 76 extending from the center of the plates and upwardly from the main body. The pin portion 76 has disposed thereon an axially mounted clamp 78 axially spaced from the plates. The clamp 78 loosely and slidably receives the support arm 66. The support arm is arranged for a small reciprocable movement in the clamp, the movement being limited by collars 80, 82 placed on the support arm 66. The support arm 66 terminates rearwardly in a handle means 84, in the vicinity of seat 24. The handle means is arranged for easy grasping by a gloved hand. The rotatable plates 70, 72 and pin 76 are mounted on the main body so that the steering member 62 may rest freely on the snow or be pressed into the snow, and turned for steering.

In operation, steering member 62 may ride on the surface of the snow and the rib means 64 provide depth and traction and a cutting force for ice, or it may be lifted out of the snow for free coasting. Lateral movement of the steering arm 66 by the handle means 84 is permitted by rotation of pin portion 76 and causes lateral displacement of the steering member and a variation in the orientation of the longitudinal axis of the steering member relative to the runners 16, 18, 22 of the main body, thereby tending to pull the sled in the direction in which the steering member is pointed. The depth of the steering member in the snow or its pressure on the snow is adjustable by the operator through axial sliding movement of the steering arm 66. The collars 80, 82 on the steering arm protect against excessive sliding movement. Further operator control, if desired, may be provided by the rotation of steering arm 66 in the clamp portion 78 to cause the steering member to impinge on the show at various lateral angles. The foregoing methods of operator control may be conveniently provided by a rectangular slot in the pin 76, instead of the clamp, whose width closely approximates the diameter of a cylindrical portion of the steering arm 66, and whose length exceeds the diameter.

It is contemplated that modifications may be made in the foregoing description of the present invention without departing from the spirit and scope of the invention. For instance, motorized propulsion may be added to the present sled. Tow rings 84, are presently mounted on the lateral sides of the front arcuate portion 14 of the main body to permit the sled to be towed behind another vehicle.

Another example of a modification within the present invention is locating the laterally rotatable mounting 68 of the steering means on the planar portion of the main body, with the steering arm extending through an aperture in the arcuate portion.

What is claimed is:

1. A sled for movement in a forwardly direction across snow comprising:
   a main toboggan-type body having a substantially flat main portion and a forward arcuate portion curving upwardly away from the snow, said main body extending longitudinally continuously from front to back and having a bottom surface in an essentially parallel plane with said snow for supportive contact with the snow for sleding, said main body further comprising a top surface opposite the bottom surface;
   at least two laterally spaced, parallel runners depending downwardly from said bottom surface of the main body and depending from said forward arcuate portion, and extending rearwardly of the main body;

seat means on the top surface of the main body, for supporting a sled operator in a low center of gravity with relation to the main body;

braking means operable by said sled operator, comprising a plate member, pivotally extending from the rear of said main body with its front edge pitched downwardly, whereby movement downward of said plate member forces its forward edge into the snow, and;

ski-type steering means, mounted on the main body of the sled, for changing directional movement of the sled, said steering means being pivotal for steering movements and raisable for free running.

2. The sled of claim 1, wherein said steering means comprises;

a forwardmost ski-type steering member having a forward arcuate portion and a rearward flat portion;

a laterally rotatable mounting on said forward arcuate portion of the main body of the sled for rotatably and slidably receiving and supporting a steering arm from the steering member; and said steering arm extending from said steering member, through said rotatable mounting, and including handle means for providing steering control to said operator of the sled.

3. The sled of claim 2, wherein said runners extend rearwardly beyond said plate member.

4. The sled of claim 2, wherein said laterally rotatable mounting further comprises:

a first plate fixedly mounted on said main body;

a second plate freely rotatably mounted on said first plate, and in parallel relation therewith, a pin extending axially from said second plate and bearing therein an opening through which passes said steering arm, and said opening being sized in relation to said steering arm to permit sliding movement of the steering arm therethrough, and further, to permit pivotal movement of the steering arm transverse to said flat main portion of the main body.

5. The sled of claim 1, wherein said braking means further comprises:

a pair of plate member support arms extending forwardly from a first side of said plate member and pivotally connected to a mounting means on the top of said main toboggan body, a single arm and extending forwardly of said mounting means, terminating in a forward handle portion operable by said sled operator.

6. The sled of claim 5 further comprising:

a lock means for receiving said single arm for locking said plate member in a plate member downward position.

* * * * *